US012062865B2

(12) United States Patent
Olgun et al.

(10) Patent No.: US 12,062,865 B2
(45) Date of Patent: Aug. 13, 2024

(54) INVERTED L ANTENNA WITH MECHANICAL LC TANK CIRCUIT

(71) Applicants: Ugur Olgun, Marina del Rey, CA (US); John Recchio, Los Angeles, CA (US); Chukwubuikem Marcel Okoli, Los Angeles, CA (US); Stoyan Hristov, Gilroy, CA (US)

(72) Inventors: Ugur Olgun, Marina del Rey, CA (US); John Recchio, Los Angeles, CA (US); Chukwubuikem Marcel Okoli, Los Angeles, CA (US); Stoyan Hristov, Gilroy, CA (US)

(73) Assignee: Snap Inc., Santa Monica, CA (US)

( * ) Notice: Subject to any disclaimer, the term of this patent is extended or adjusted under 35 U.S.C. 154(b) by 73 days.

(21) Appl. No.: 17/979,574

(22) Filed: Nov. 2, 2022

(65) Prior Publication Data

US 2024/0145927 A1 May 2, 2024

(51) Int. Cl.

*H01Q 1/27* (2006.01)
*H01Q 1/24* (2006.01)
*H01Q 1/38* (2006.01)
*H01Q 9/42* (2006.01)
*H01Q 19/10* (2006.01)
*H01Q 21/22* (2006.01)

(52) U.S. Cl.

CPC ............... *H01Q 9/42* (2013.01); *H01Q 1/246* (2013.01); *H01Q 1/38* (2013.01); *H01Q 19/10* (2013.01); *H01Q 21/22* (2013.01)

(58) Field of Classification Search

CPC ............ H01Q 9/42; H01Q 1/24; H01Q 1/246; H01Q 1/273; H01Q 19/10; H01Q 21/22

See application file for complete search history.

(56) References Cited

U.S. PATENT DOCUMENTS 11,237,412 B1 * 2/2022 Olgun .................... H01Q 1/273
2014/0091974 A1 4/2014 Desclos et al.
2016/0079660 A1 3/2016 Bevelacqua et al.

FOREIGN PATENT DOCUMENTS

CN 103563169 A * 2/2014 ............ H01Q 1/243
WO WO-2018165201 A1 * 9/2018 ............ G02C 11/10

OTHER PUBLICATIONS

International Search Report and Written Opinion for International Patent Application No. PCT/US2023/078195, dated Feb. 12, 2024 (Feb. 12, 2024)—12 pages.

* cited by examiner

*Primary Examiner* — Hoang V Nguyen

(74) *Attorney, Agent, or Firm* — Culhane PLLC; Stephen J. Weed

(57) ABSTRACT

A device having a dual-inverted L antenna (DILA) and an LC tank circuit configured to improve specific absorption rate (SAR) hotspots. The SAR hotspots are split between a first aperture defined between the DILA and a daughter printed circuit board (PCB), and the second aperture defined between the daughter PCB and a battery casing. A main PCB is coupled to battery by a flexible circuit board (FCB). The DILA is configured to radiate RF energy at a first frequency, and the LC tank circuit is configured to radiate RF energy at a second frequency to improve bandwidth.

20 Claims, 8 Drawing Sheets

INVERTED L ANTENNA WITH MECHANICAL LC TANK CIRCUIT

TECHNICAL FIELD

Examples set forth in the present disclosure relate to the field of multi-band antennas.

BACKGROUND

A multi-band antenna enables data transmission over multiple frequencies, which in turn enables increased data throughput. A highly efficient radiator allows significantly enhanced communication range and reduces the overall energy consumption.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1:
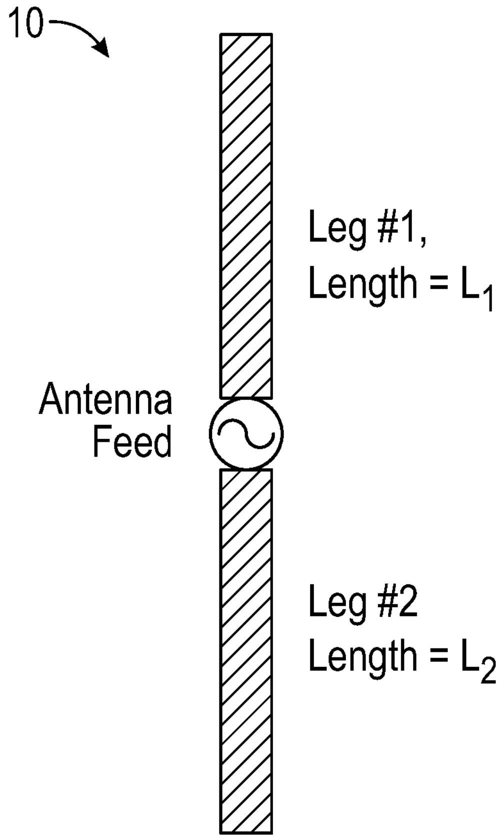
FIG. 1 illustrates a common dipole antenna.

A device having a dual-inverted L antenna (DILA) and an LC tank circuit configured to improve specific absorption rate (SAR) hotspots. The SAR hotspots are split between a first aperture defined between the DILA and a daughter PCB, and the second aperture defined between the daughter PCB and a battery casing. A main PCB is coupled to battery by a flexible circuit board (FCB). The DILA is configured to radiate RF energy at a first frequency, and the LC tank circuit is configured to radiate RF energy at a second frequency to improve bandwidth.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Advanced AR technologies, such as computer vision and object tracking, may be used to produce a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. Hand and finger recognition and tracking in real time is one of the most challenging and processing-intensive tasks in the field of computer vision.

The term "pose" refers to the static position and orientation of an object at a particular instant in time. The term "gesture" refers to the active movement of an object, such as a hand, through a series of poses, sometimes to convey a signal or idea. The terms, pose and gesture, are sometimes used interchangeably in the field of computer vision and augmented reality. As used herein, the terms "pose" or "gesture" (or variations thereof) are intended to be inclusive of both poses and gestures; in other words, the use of one term does not exclude the other.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Efficient and multiband antenna radiation in the smallest physical volume possible is a strong desire for any wireless communication application. Simply put, a highly efficient radiator allows significantly enhanced communication range and reduces the overall energy consumption. A multiband antenna enables data transmission over multiple frequencies, which in turn enables increased data throughput. In many new consumer electronics devices, however, the antenna design is compromised in favor of fashion and style and typically provided with electrically very small volume. As such, antenna engineering needs to get much smarter in reusing existing metal in the device to avoid poor efficiency and complicated RF front ends to meet radiation specifications.

Frequently, descendants of one of the two fundamental antenna types are employed in consumer electronic devices, loop antennas or dipole/monopole antennas. The dipole antenna, which is the most common, is depicted at 10 in FIG. 1 in its ideal form. It is important to note that dipole antennas are called "electric type" antennas since their main radiating mode is $TM_{10}$, which means that the antenna generates electric fields that are orthogonal to the direction of propagation. In FIG. 1, the sum of the lengths of antenna Leg 1 and Leg 2, $l_1$ and $l_2$ (i.e., total length), determines a first resonant frequency of the dipole antenna 10 where it supports the $TM_{10}$ mode. The ratio of lengths of $l_1$ to $l_2$ determines the input impedance of the dipole antenna 10 at that resonant frequency. As a way of example, a self-resonant, $TM_{10}$ supporting dipole antenna 10 in air designed for a 1.575 GHz frequency GNSS operation would need $l_1=l_2=\sim4.56$ cm. This length is too long in a wearable consumer electronics device, such as a smart eyewear device, to be just dedicated to the antenna element itself.

Figure 2:
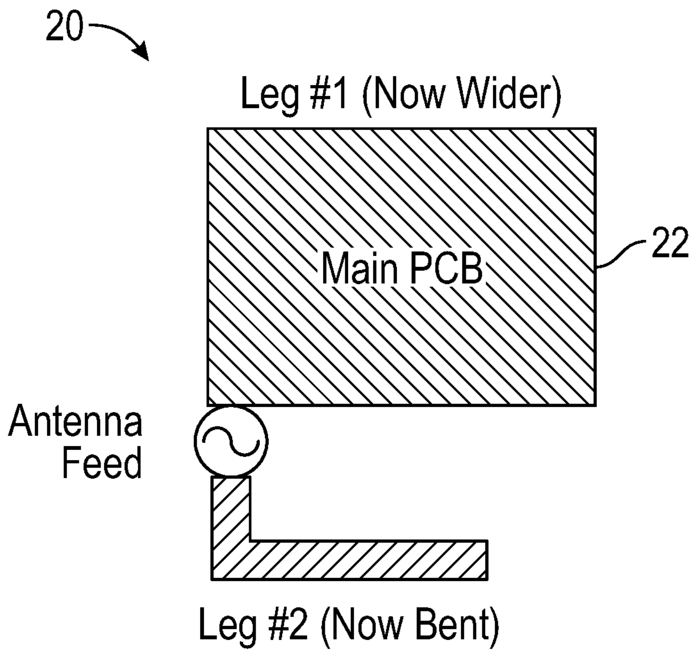
FIG. 2 illustrates a dipole antenna including a main printed circuit board (PCB) forming one of the legs of the dipole antenna.

Typically, a dipole antenna is incorporated into a consumer electronics device by the method shown as dipole antenna 20 in FIG. 2. The first antenna Leg 1 is widened and reuses an existing main PCB 22 in the device. The second antenna Leg 2 is typically bent to save space while keeping the leg length the same. One or both of Leg 1 and Leg 2 could be encapsulated in a low loss dielectric material to further reduce the length needed for the dipole antenna to operate, a technique called dielectric loading.

The antenna design technique shown as dipole antenna 20 in FIG. 2 is the basic building block for many of the antenna architectures found in consumer electronics devices since the early 1990s. Over time, this antenna design received a name and now it is called an Inverted L antenna (ILA), as it looks like an L, that is rotated and sits above the main PCB 22. Many consumer electronics devices incorporating the ILA design added additional legs to the antenna, as shown as dipole antenna 30 in FIG. 3. The electrical length of each Leg 1 and Leg 2 is tuned to operate at a specific frequency band. The total length of both Leg 1 and Leg 2 together is also relevant as it provides another radiation mode, called the common mode. As such, with an antenna design shown as dipole antenna 30 in FIG. 3, it is technically possible to operate in 3 distinct frequency bands, where the length of each Leg 1 and Leg 2 determining a frequency band of operation (frequency f1 and frequency f2) and their total length determining another (frequency f3). Naturally, f3 is a lower frequency compared to f1 and f2. This is commonly done in many consumer electronics devices on the market today to achieve low-cost multiband operation.

Figure 4:
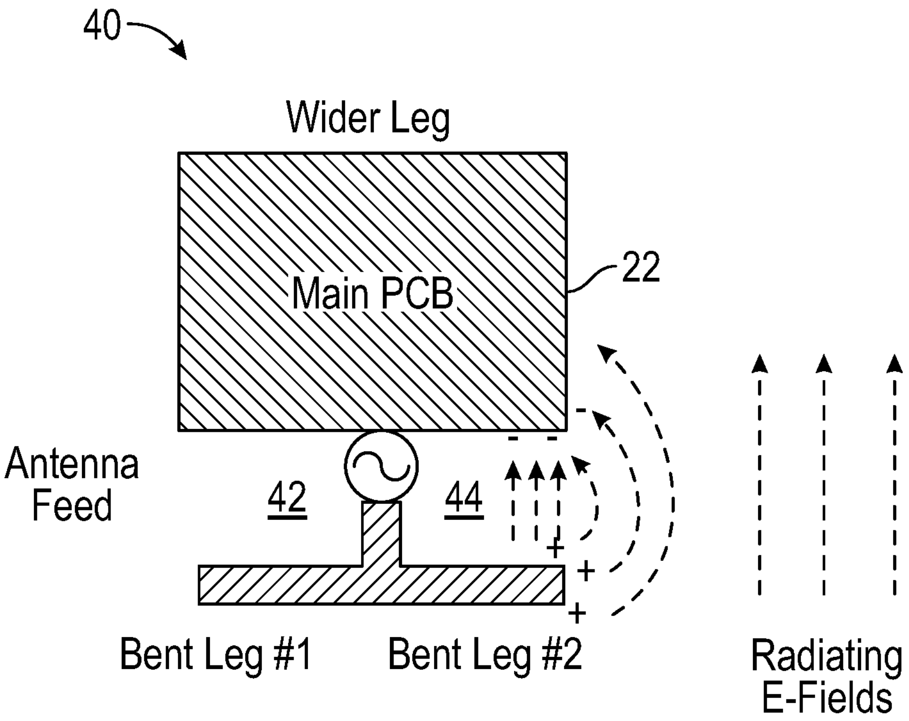
FIG. 4 illustrates E-fields generated by the DILA of FIG. 3.

In many consumer electronics applications, the main antenna performance benchmark is radiation efficiency. Another benchmark, SAR (specific absorption rate), plays a very important role in antenna design. SAR is a regulatory compliance metric that measures how much of the radiating energy by the antenna is absorbed by the human tissue, at a specific volume. There are strict requirements on SAR performance for consumer electronics. SAR performance is determined by how much power the antenna is radiating and how it is radiating it. The lower energy antenna radiates, or the lower field concentration an antenna has, the better SAR performance it will have. From an engineering perspective, the antenna radiation efficiency is the primary metric and as such, it is desired to radiate as much power as possible made available by the RF (radio frequency) front end as efficiently as possible, which contrasts with the SAR objectives. Looking at the radiation mechanism of a dual ILA (DILA) dipole antenna 40 as shown in FIG. 4, this dipole antenna 40 illustrates some of the challenges this antenna has with respect to SAR compliance.

The tip of the legs of the dipole antenna 40 will accumulate positive (or negative depending on the phase) charges in the frequency of operation. These charges are neutralized by opposing charges on the opposite leg, in this case the wider leg (e.g., Main PCB 22). An E-field will be generated as a result of these opposing charges over an aperture 42 and aperture 44 in between the two metal pieces forming the legs. At the edge of the antenna, these E-fields will begin to change shape as shown by dashed lines shown in FIG. 4 and as they progress further away from the dipole antenna 40, they will become untethered from the dipole antenna 40 itself and start radiating into the air. The E-fields are particularly strong at the tip of the dipole antenna 40 as that's where most charge accumulates. These E-fields are very effective in maximizing the antenna radiation efficiency, however, they also are SAR hotspots as the energy is concentrated at a specific location. Antenna engineers use various techniques to overcome this problem, like on smartphones using antenna switching. When hand holding a smartphone, the antenna at the top of the device (furthest from the hand) could be activated, and when the device is held against the head, the antenna at the bottom of the device (furthest from the head) can be activated. This is an expensive solution but effective. On less complicated devices, such as cellular mobile hotspots, the RF output power is cut back when proximity to tissue is detected. This is a compromise but allows for these devices to be compliant with the regulatory framework.

Eyewear Devices

Eye-wearable devices are different in their mechanical construction than most consumer electronics devices in the market. Typically, a bucket approach is used in assembling a majority of the smart electronic devices available for consumers today. This includes devices such as phones, watches, speakers, even thermostats. In most cases, a plastic or metal housing would form the bucket, then the battery and main PCB would go inside this bucket, and in the end the bucket would be capped off with a display. It is relatively straightforward to implement the antenna architecture shown in FIG. 2 with such a mechanical architecture, by relying on the main PCB 22 for efficient radiation and placing the bent antenna Leg 2 on one of the opposing edges.

However, for eye-wearable devices, this mechanical architecture is not necessarily feasible. The displays are optically transparent and designed to be in front of the wearer's eyes. As such, batteries and PCBs cannot be stacked with the display. As these eye-wearable devices are also fashion accessories, the battery and the main boards cannot be easily co-located, as the space needed would be too wide, or too thick. Typically, the main PCB 22 with critical electrical components, such as system on a chip (SOC) or a Wireless RF Front End, reside on narrow but longer PCBs 22 on the temples. An ideal place for a battery 52 is the tip of the temple at the back as it helps balance the weight of the optical systems at the front of the wearable devices. The temple of this architecture is illustrated at 50 in FIG. 5.

Figure 3:
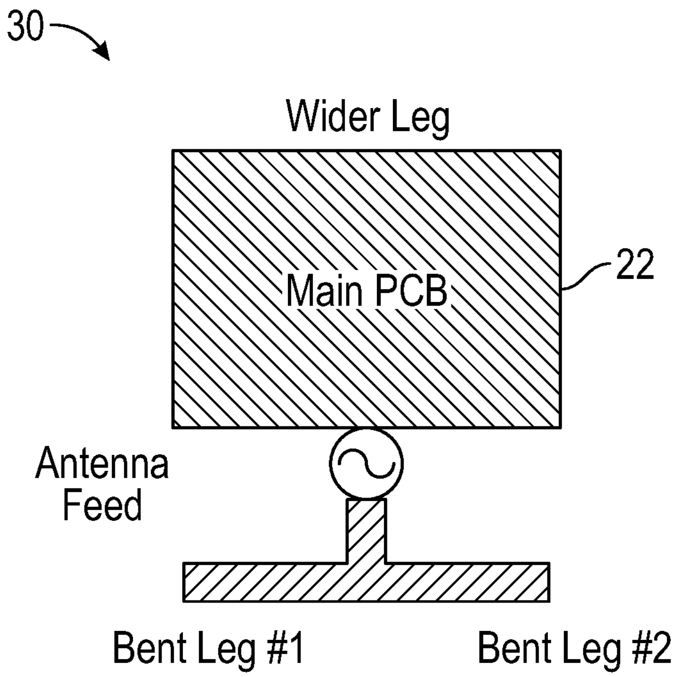
FIG. 3 illustrates a dual-inverted L antenna (DILA) with two bent legs and a main PCB.
Figure 5:
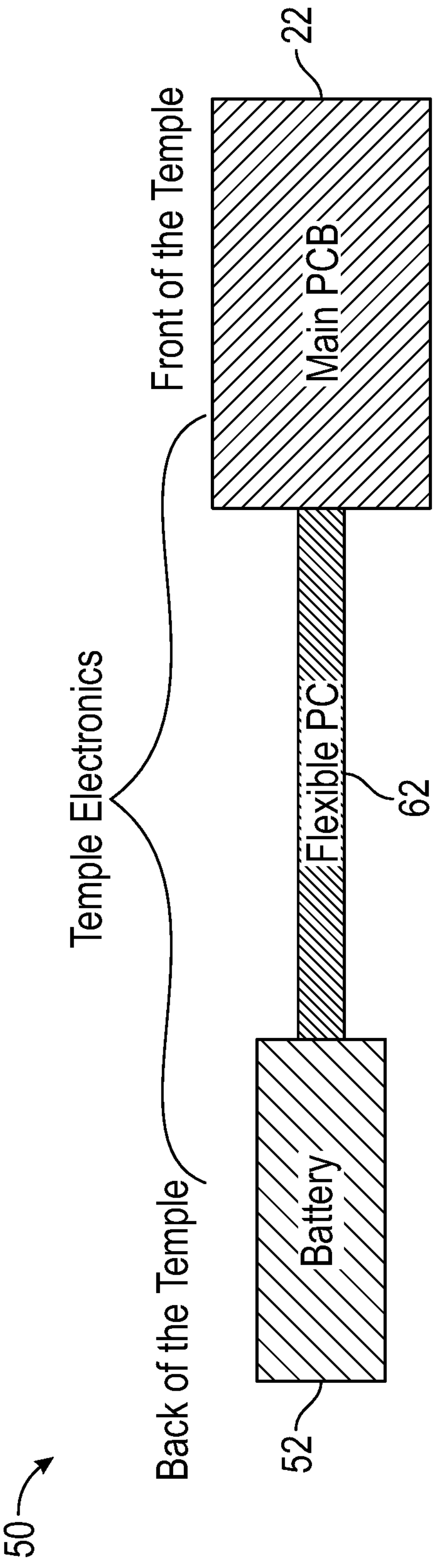
FIG. 5 illustrates a temple of an eyewear device having a main PCB coupled to a battery via a flexible circuit board (FCB)
Figure 6:
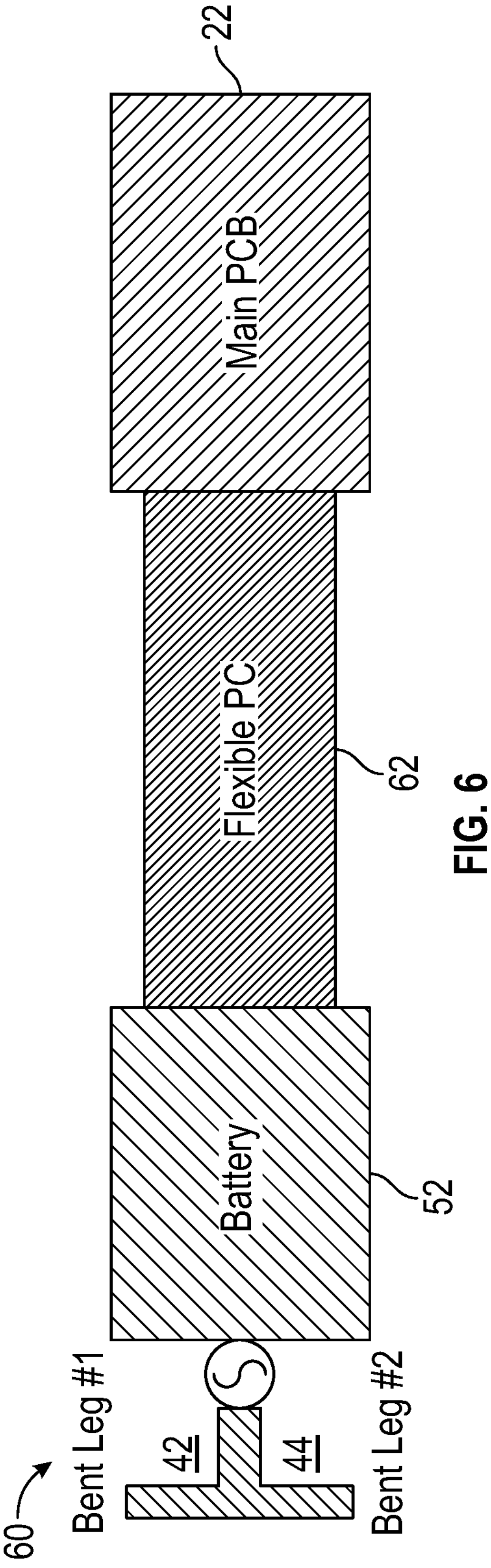
FIG. 6 illustrates the DILA coupled to a battery.
Figure 7:
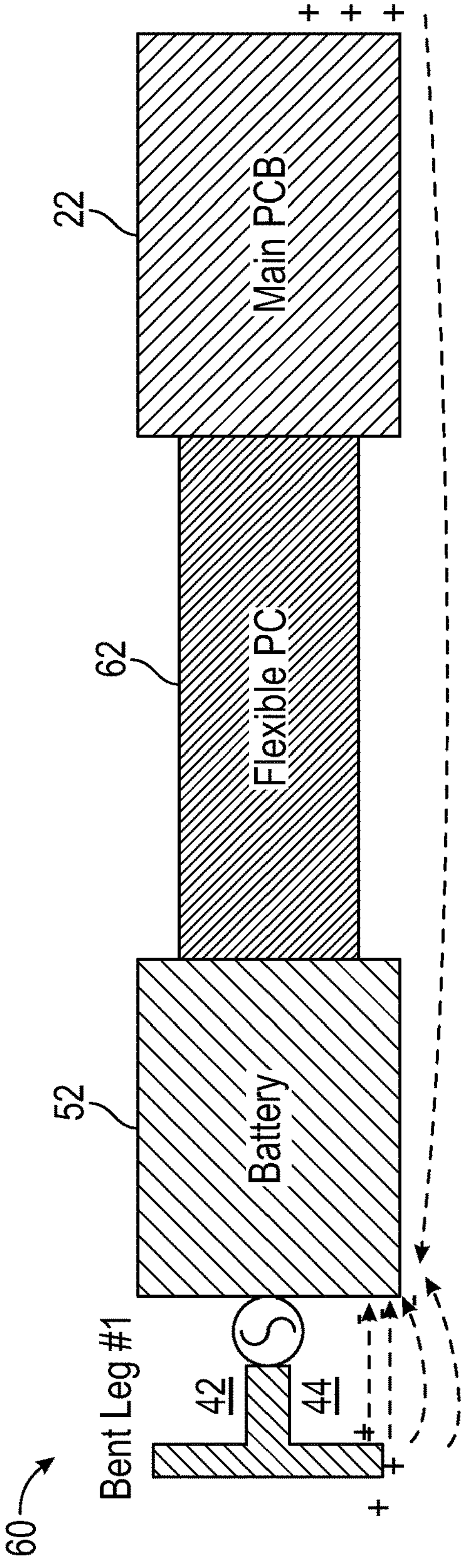
FIG. 7 illustrates E-fields generated by the DILA of FIG. 6.

For the mechanical architecture presented in FIG. 5, the DILA implementation shown in FIG. 3 needs to be reconfigured to be applicable. A configuration of a dipole antenna 60 is shown in FIG. 6. The wider leg of the dipole antenna 60 in this example is an electrical combination of a casing of the battery 50, a flexible printed circuit (FPC) 62, and the main PCB 22. The DILAs are excited against the wider leg. By replicating the functional dipole antenna design of FIG. 4 for the dipole antenna 60 design shown in FIG. 6, the electrical charge accumulation for this dipole antenna 60 design is shown in FIG. 7. As shown, the main radiating E-fields are very similar. The positive charges accumulate on the right side of the dipole antenna 60 that is operating and active, while the negative charges accumulate on the opposite side of the dipole antenna 60. One difference, however, is the generation of positive charges at the other end of the main PCB 22 and a subsequent generation of E-fields from these charges (illustrated by dashed lines), directionally opposing the ones that were intentionally generated for radiation (illustrated by dashed lines). These charges are generated as a result of eddy currents. In this dipole antenna 60 design, eddy currents exist and are unavoidable due to the fact that every time varying E-field has to create an orthogonal H-field and some of this H-field will impinge on the nearby metal and create eddy currents that will in turn create opposing E-fields to the main radiation mechanism. It is sort of nature's way of resisting human construction, like when air gets thicker as one moves faster through it and tries to slow you down. It should be noted that these fields are significantly weaker due to the fact that they are generated from a second order mechanism (radiating E-field→radiating H-field→eddy current→charge accumulation→opposing E-field), and more importantly, the distance between the positive and negative charges are significantly larger than the apertures 42 and 44 in the main radiation mechanism. Overall, these fields get little mention in typical antenna design processes since their impact is minimal to non-existent. However, this physical fact is leveraged, and used as an advantage.

Figure 8:
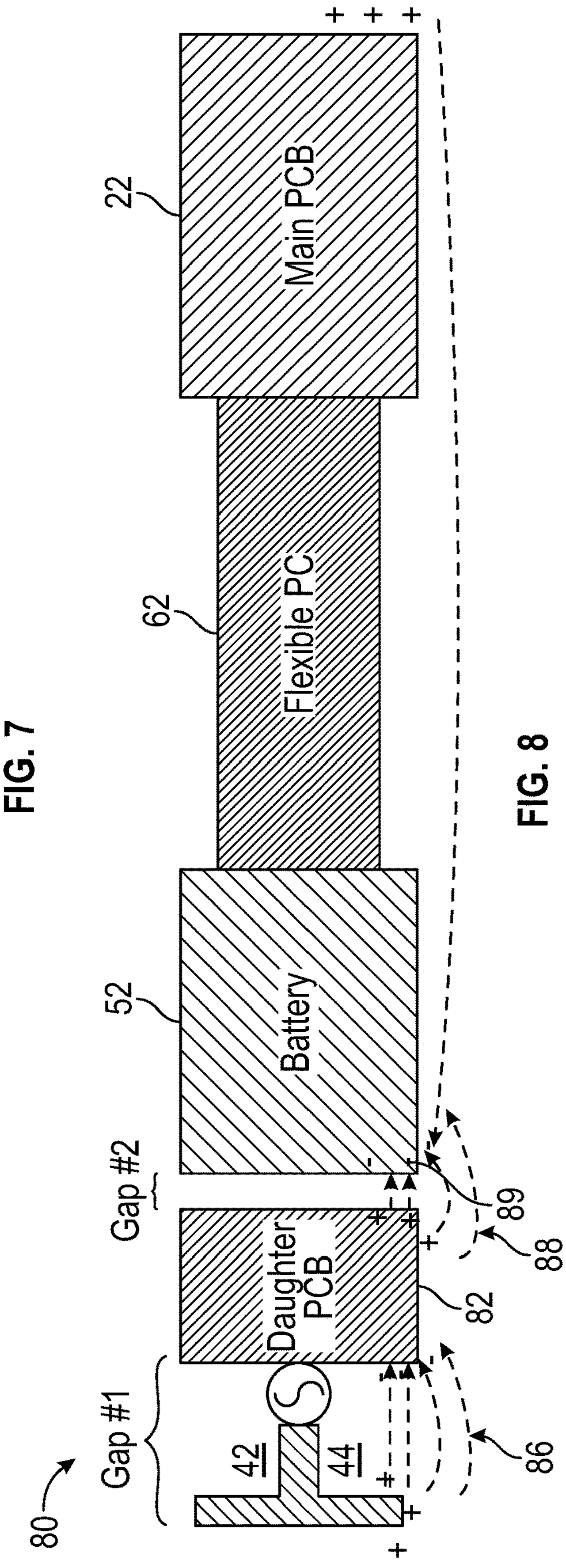
FIG. 8 illustrates a daughter PCB coupled to the DILA and creating two apertures.

A dipole antenna 80 is shown in FIG. 8 that adds a new metal structure, a daughter PCB 82 in this example, positioned in between the DILA and the original wide leg, which was composed of the battery 52, FPC 62, and the main PCB 22. A Gap #1 in between the daughter PCB 82 and the battery 52 is strictly controlled and important to the design of dipole antenna 80. The positive and negative charges 86 shown in FIG. 8 are created as part of the DILA operation as explained in the previous section. The positive charges 88 are essentially the ones created by the eddy currents, but this time, since there is metal across these positive charges, the case of battery 52 in FIG. 8 accumulates negative charges to balance this new development, negative charges 89. The newly formed positive charges 88 and negative charges 89 create their own E-fields, which due to the nature of the structure, aligns perfectly with the original E-fields that the DILA creates. In essence, now there are two apertures that are effectively contributing to the radiation from this dipole antenna 80 structure, the first aperture being depicted as Gap #1 and the second aperture depicted by Gap #2 in FIG. 8. The dimensions of these gaps and the separation between them are parameters in adjusting the radiation bandwidth of the dipole antenna 80 and how the energy is distributed on the physical structure. The first part is very important as a new technique, like this one, improving the antenna bandwidth always leads to a more ID-friendly, fashionable dipole antenna design, i.e., lighter, smaller, and more efficient than the alternative. However, for eye wearable devices, the latter is arguably more important as it is a newly found knob that can be utilized to distribute the energy and meaningfully reduce SAR. Reduced SAR allows the eyewear device to dissipate heat more effectively on the human tissue and allow it to be compliant with regulatory requirements without sacrificing antenna performance. Essentially, the compromises previously mentioned by other consumer electronics devices on the market are not necessary, and for an eye wearable device that is designed to be always worn on the head during usage, this is a critical win.

Figure 9:
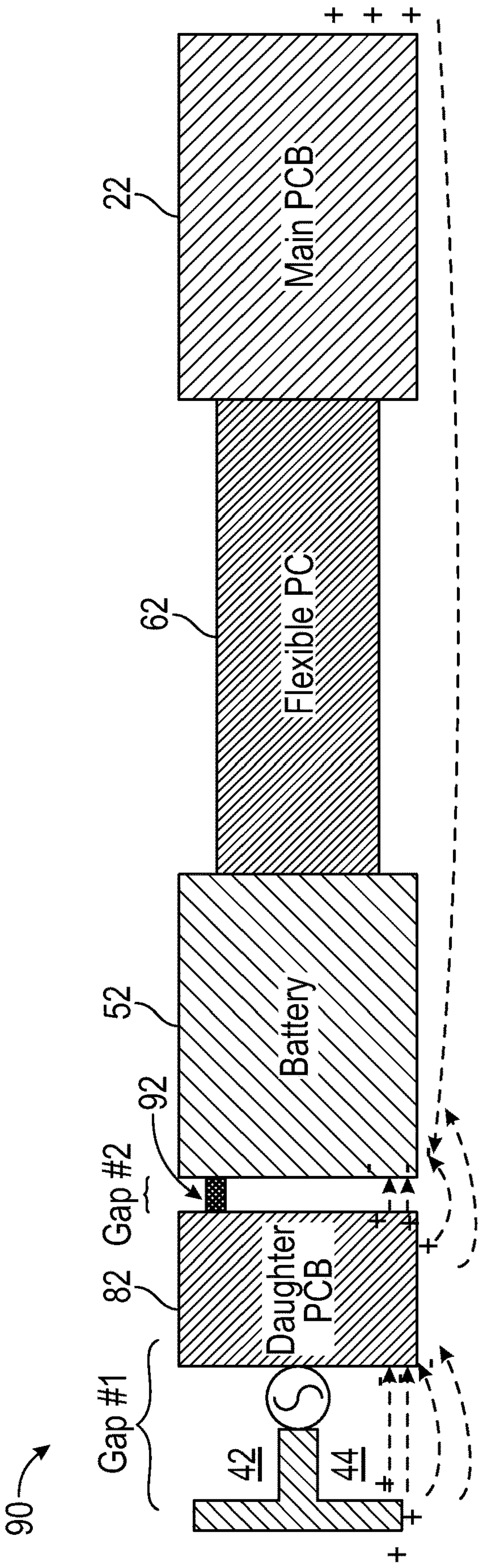
FIG. 9 illustrates E-fields generated across the two apertures.
Figure 10:
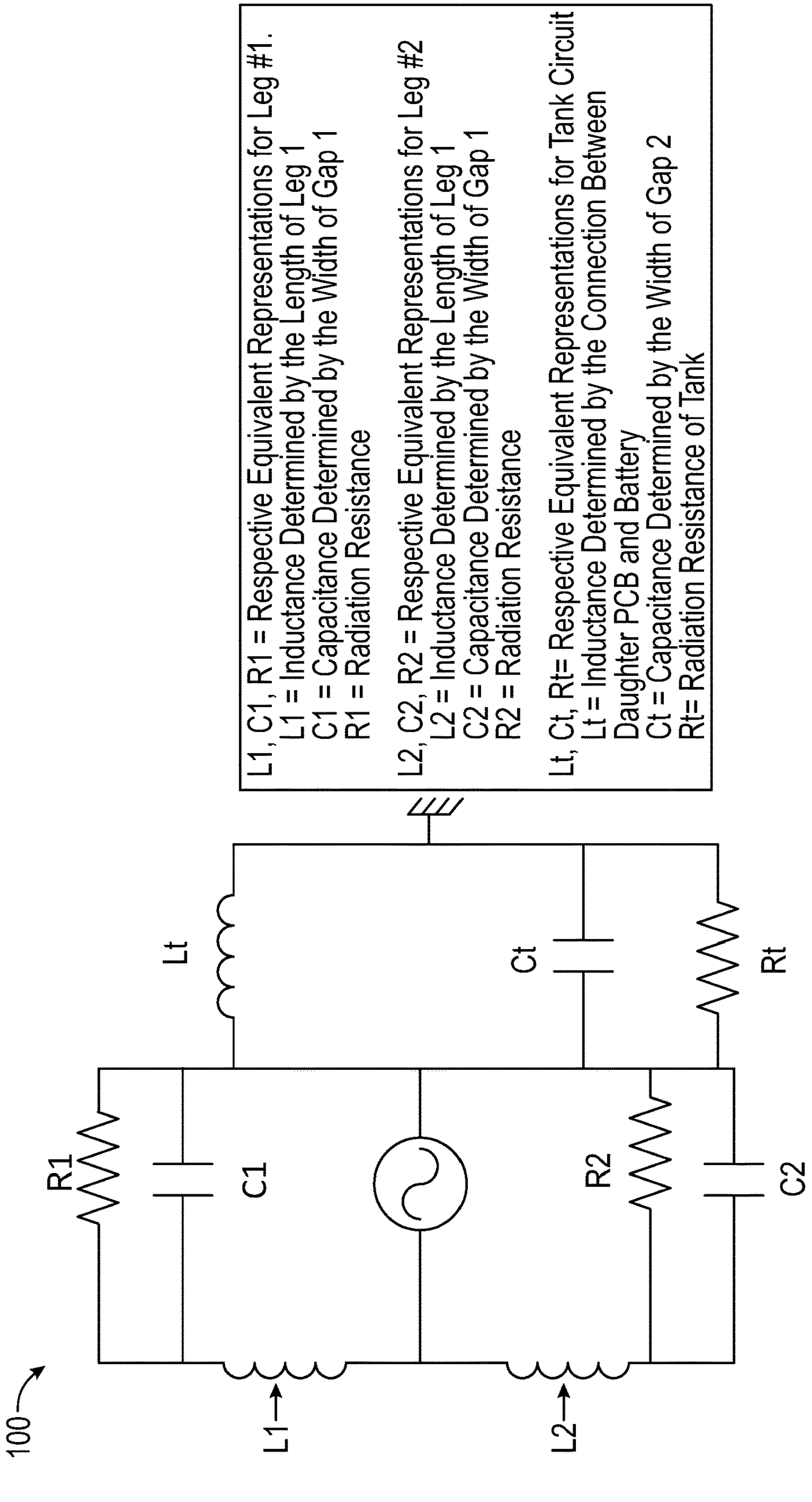
FIG. 10 illustrates an inductor-capacitor (LC) tank circuit coupled to the DILA.

Taking a step back from the over-simplified depiction of dipole antenna 80 in FIG. 8, it is important to note what happens to the E-fields that are not radiating. An observant eye might have noticed that the E-fields on the edge of the radiating aperture are detaching from the physical structure, however, a meaningful portion of the E-fields inside the aperture are essentially trapped there. This is true, especially with the simplified dipole antenna illustrations of FIG. 4, FIG. 7, and FIG. 8. Since the E-fields are time varying signals, the phase changes and the direction of the E-fields change but the ones inside the aperture are still trapped in there, just like a parallel plate capacitor. If this was a parallel plate capacitor, after the transient stage, the capacitor would get full and the source, in this case the antenna feed, would not be able to push more energy into it. For the DILA, the antenna legs essentially act as an inductor to this capacitance phenomenon. The currents have to travel along the antenna legs before they can start creating charges, which in turn create E-fields. This simple fact is why they are called resonant antennas. At resonance frequency, the inductance that is stemming from the physical length of the dipole antenna 80 cancels the capacitance that is created by the accumulation of the charges and the trapped E-fields. The "lost" E-fields that radiate out can be modeled as a resistor in a typical RLC (resistor, inductor, capacitor) modeling of the dipole antenna 90 as shown in FIG. 10. This is well understood for DILA, however, for this change introduced in the dipole antenna 80 of FIG. 8, there is only the capacitance. As such, in order for the dipole antenna 80 design shown in FIG. 8 to actually accept energy and work as it is described in the previous paragraph, an inductance is added. The value of the inductance is important in establishing the right resonance frequency. In an example, this inductance is accomplished by a strategic placement of a metal connection 92 extending between the daughter PCB 82 and the battery 52 in the dipole antenna 90 shown in FIG. 9. In short, the width of Gap #2 and length of the aperture in between the daughter PCB 82 and battery 52 determine the capacitance, and the length and width of the inductive metal connection 92 determines the inductance. These are essentially new knobs to define to increase the bandwidth of the dipole antenna 90 or to radiate at the same frequency as the DILA and distribute energy across two separate apertures. Since this inductance and capacitance is accomplished by mechanical parts for maximum efficiency, it is called a mechanical LC tank circuit 100 as shown in FIG. 10. This tank circuit 100 significantly enhances the dipole antenna 90 bandwidth and the SAR performance.

Another example of the dipole antenna 90 design is the DILA is stacked on top of the daughter PCB 82. In FIG. 9, the DILA is coplanar with all the metal shown, however, when the DILA is stacked on top of the daughter PCB 82, then the radiating E-fields are pointing inwards, while the E-fields from the mechanical LC are as they are as shown in FIG. 9, towards the right side. As such, this means that the main radiating E-fields from DILA and the secondary radiating E-fields from the mechanical tank circuit 100 are orthogonal to each other. In the physical world, this means the overall structure has dual polarized radiation characteristics. Polarization is not a topic that is widely adopted in antenna design for consumer electronics devices due to the unpredictable nature of the real world and how the signals would change polarization after they bounce from random objects. However, the dual polarized antenna design allows the eye wearable to be more resilient to nature's obstacles and establish a more reliable communication link with the other end of the radio.

Figure 11:
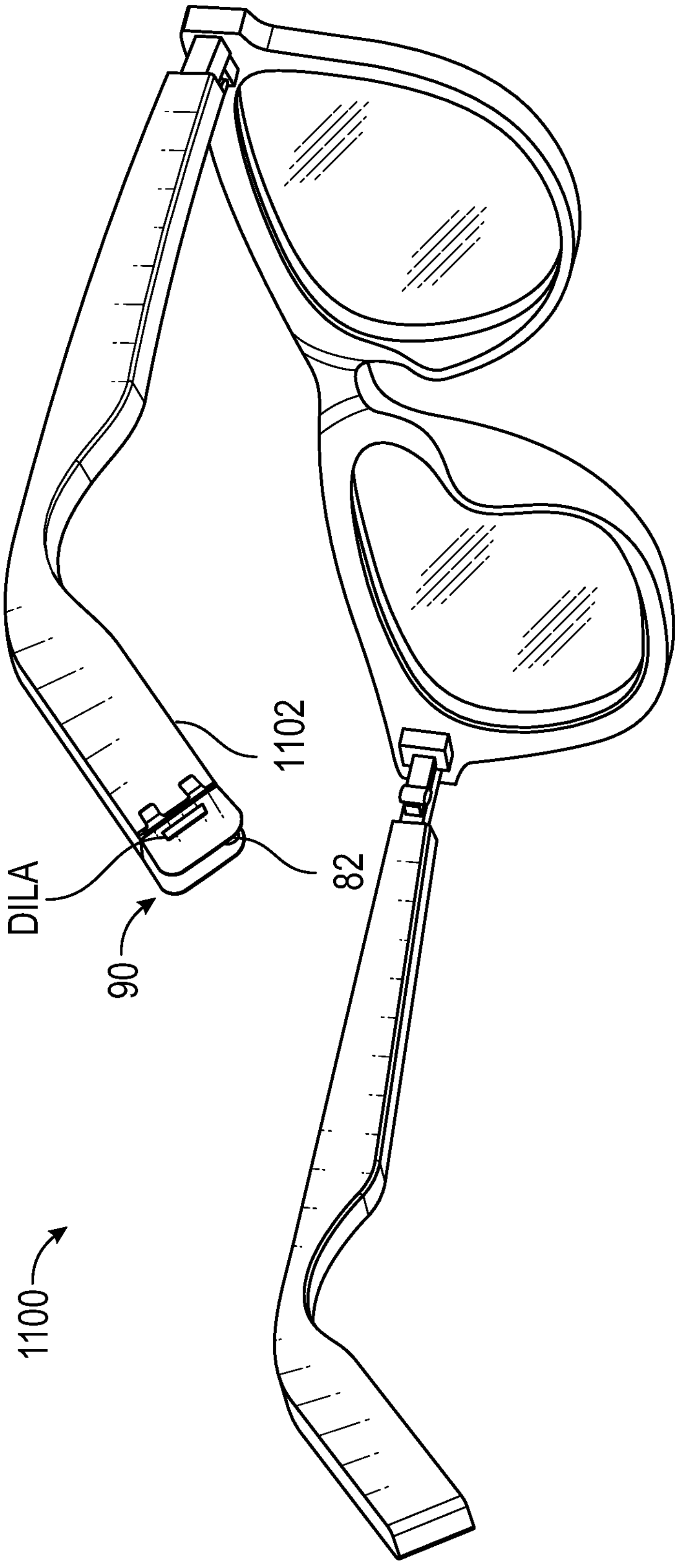
FIG. 11 illustrates a distal end of an eyewear device temple including the dipole antenna of FIG. 9.

FIG. 11 illustrates an example eyewear device 1100 with a cover at a distal end of a temple 1102 removed. The daughter PCB 82 and the DILA of the dipole antenna 90 is shown.

Figure 12:
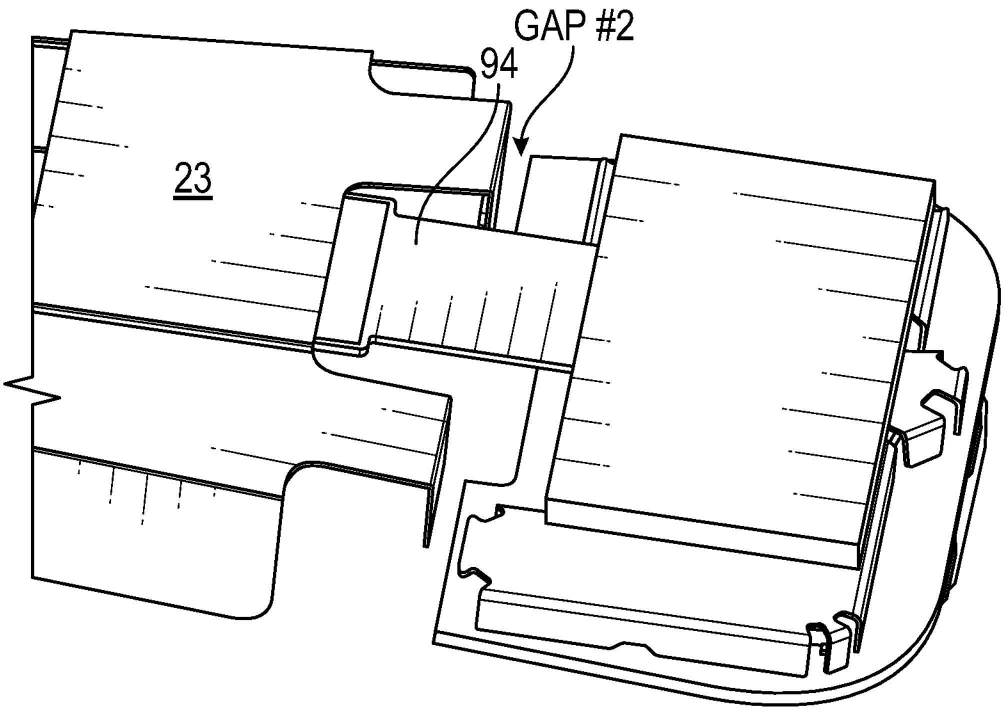
FIG. 12 illustrates an enlarged portion of the eyewear temple including the dipole antenna of FIG. 9.

FIG. 12 illustrates an enlarged portion of the dipole antenna 90, illustrating a battery casing 23 and the inductive connection 94. Battery casing 23 may refer to a metal battery shell that is integrated into the battery design to protect the battery cell(s) from environmental conditions or a separate metal enclosure that protects pouch-cell type batteries from impact and dissipates heat to maintain optimal battery temperature.

Figure 13:
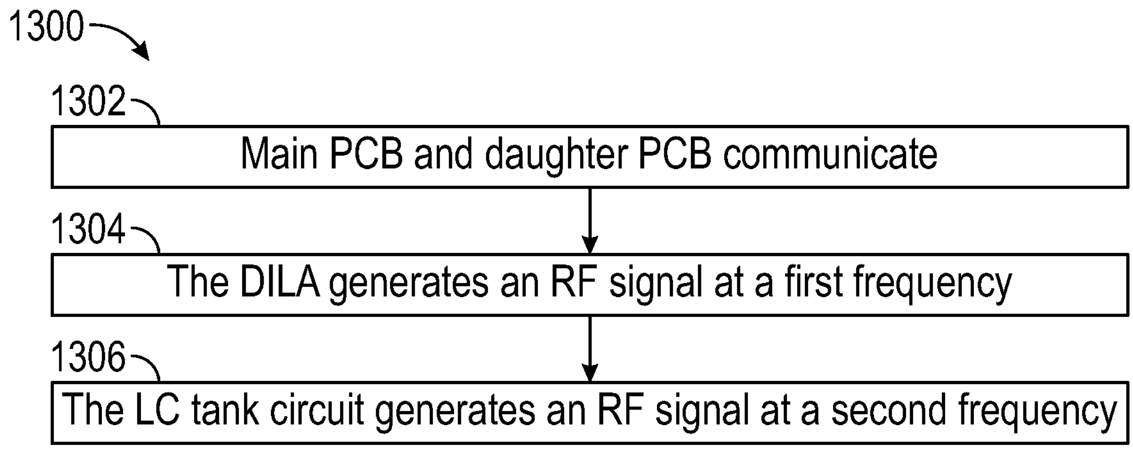
FIG. 13 illustrates a method of operating the dipole antenna of FIG. 9.

FIG. 13 is a flowchart 1300 illustration a method of operating the dipole antenna 90.

At block 1302, the main PCB 22 and the daughter PCB 62 cooperatively communicate electrical signals to operate the dipole antenna 90. This communication includes a controller controlling RF electronic components on one or both the main PCB 22 and the daughter PCB 62, to send electrical signals to the DILA and the tank circuit 100.

At block 1304, the DILA generates an RF signal at the first frequency. The first frequency is established as a function of the first and second legs, and the dimension of the apertures 42 and 44. An E-field is generated across the apertures as shown in FIG. 9.

At block 1306, the tank circuit 100 generates an RF signal at a second frequency. This tank circuit 100 significantly enhances the dipole antenna 90 bandwidth and the SAR performance. The main radiating E-fields from the DILA and the secondary radiating E-fields from the mechanical tank circuit 100 are orthogonal to each other. This means the overall structure has dual polarized radiation characteristics.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A device, comprising;

a battery;

a main printed circuit board (PCB) coupled to the battery;

a daughter PCB separated from the battery by a first aperture; and a dual-inverted L antenna (DILA) having a first leg and a second leg configured to generate radio frequency (RF) radiation at a first frequency, wherein the DILA is electrically coupled to the daughter PCB, and wherein a second aperture is defined between the daughter PCB and the legs of the DILA.

2. The device as specified in claim 1, further comprising an inductor-capacitor (LC) tank circuit coupled to the DILA, wherein the LC tank circuit comprises the inductor extending between the daughter PCB and the battery.

3. The device as specified in claim 2, wherein the LC tank circuit is configured to leverage eddy currents by providing constructive E-fields generated across the first aperture and the second aperture.

4. The device as specified in claim 3, wherein the DILA first leg is wider than the DILA second leg.

5. The device as specified in claim 4, wherein a mechanical capacitance is configured to be generated as a function the second aperture and a width and length of the first leg.

6. The device as specified in claim 2, wherein a mechanical inductance is configured to be generated as a function of a width and length of the inductor.

7. The device as specified in claim 2, wherein the LC tank circuit is configured to generate RF radiation at a second frequency.

8. The device as specified in claim 7, wherein first frequency and the second frequency are the same, such that specific absorption rate (SAR) hotspots are split between the first aperture and the second aperture to reduce SAR.

9. The device as specified in claim 7, wherein first frequency and the second frequency are different, such that a bandwidth of the DILA is enhanced.

10. The device as specified in claim 9, wherein the DILA and the LC tank circuit are coplanar.

11. The device as specified in claim 9, wherein the DILA and the LC tank circuit are stacked.

12. The device as specified in claim 1, further comprising a flexible circuit board (FCB) coupling the main PCB to the battery.

13. The device as specified in claim 12, wherein the battery has a case electrically coupled to the FCB.

14. A method of operating a device comprising a battery, a main printed circuit board (PCB) coupled to the battery, a daughter PCB separated from the battery by a first aperture, and a dual-inverted L antenna (DILA) having a first leg and a second leg configured to generate radio frequency (RF) radiation at a first frequency, wherein the DILA is electrically coupled to the daughter PCB, and wherein a second aperture is defined between the daughter PCB and the legs of the DILA, the method comprising:

the DILA radiating RF energy at the first frequency.

15. The method as specified in claim 14, wherein the device further comprises an inductor-capacitor (LC) tank circuit coupled to the DILA, wherein the LC tank circuit radiates RF energy at a second frequency.

16. The method as specified in claim 15, wherein the LC tank circuit comprises the inductor extending between the daughter PCB and the battery.

17. The method as specified in claim 15, wherein the LC tank circuit leverages eddy currents by providing constructive E-fields generated across the first aperture and the second aperture.

18. The method as specified in claim 15, wherein a mechanical inductance is generated as a function of a width and length of the inductor.

19. The method as specified in claim 15, wherein first frequency and the second frequency are the same, such that specific absorption rate (SAR) hotspots are split between the first aperture and the second aperture to reduce SAR.

20. The method as specified in claim 14, wherein a mechanical capacitance is generated as a function the second aperture and a width and length of the first leg.

* * * * *